United States Patent [19]

Laing

[11] Patent Number: 5,404,720
[45] Date of Patent: Apr. 11, 1995

[54] ALTERNATOR POWERED ELECTRICALLY HEATED CATALYST

[75] Inventor: Paul M. Laing, Westland, Mich.

[73] Assignee: Ford Motor Company, Dearborn, Mich.

[21] Appl. No.: 106,749

[22] Filed: Aug. 16, 1993

[51] Int. Cl.$^6$ ............................................. F01N 3/20
[52] U.S. Cl. ....................................... 60/284; 60/286; 60/300
[58] Field of Search ........................... 60/284, 300, 286

[56] References Cited

U.S. PATENT DOCUMENTS

| | | | |
|---|---|---|---|
| H1113 | 12/1992 | Yoshizaki | 60/284 |
| 4,673,797 | 6/1987 | Weirick | 219/203 |
| 4,862,055 | 8/1989 | Maruyama et al. | 322/8 |
| 4,911,894 | 3/1990 | Retallick et al. | 422/174 |
| 5,072,098 | 12/1991 | Matthews et al. | 219/501 |
| 5,094,074 | 3/1992 | Nishizawa et al. | 60/300 |
| 5,155,995 | 10/1992 | Kinnear et al. | 60/300 |
| 5,163,290 | 11/1992 | Kinnear | 60/274 |
| 5,265,418 | 11/1993 | Smith | 60/284 |
| 5,327,991 | 7/1994 | Yoshida | 60/300 |

Primary Examiner—Douglas Hart
Attorney, Agent, or Firm—Roger L. May; Peter Abolins

[57] ABSTRACT

An assembly is disclosed for reducing emissions produced by an internal combustion engine of a motor vehicle. The assembly comprises a catalyst, a battery, an alternator, and a control relay. The catalyst is disposed in a catalytic converter downstream of the engine and receives exhaust gases therefrom. The catalyst is disposed proximate a substrate of the catalytic converter, which heats the catalyst when electrical power is supplied to the substrate. The alternator is in selective electrical communication with the battery and with the substrate, and is electrically connectable to the substrate to supply power thereto when the engine is operating. The control relay puts the alternator in electrical communication with either the battery, or with the substrate when the engine is started. A voltage regulator is also preferably provided in communication with the battery and with the alternator.

19 Claims, 1 Drawing Sheet

ALTERNATOR POWERED ELECTRICALLY HEATED CATALYST

TECHNICAL FIELD

This invention relates to electrically heated catalysts for motor vehicles.

BACKGROUND ART

In motor vehicles, heated catalysts are known to be very effective at reducing hydrocarbon (HC) and carbon monoxide (CO) emissions. Typically, heat for this application is developed in the catalyst during cold start ups by means of a heating element powered by the battery of the motor vehicle. Electrical energy supplied to the heating element brings the temperature of the catalyst up quickly to improve its effectiveness as soon as possible after the engine starts.

However, conventional electrically heated catalysts have several significant problems associated with them. One drawback is that the motor vehicle battery is subject to severe treatment which can cause a substantial reduction in battery life. Furthermore, the motor vehicle incurs a significant weight increase and attendant fuel economy penalty due to the control system, wiring, and auxiliary battery which may be necessary to operate the electrically heated catalyst.

SUMMARY OF THE INVENTION

The present invention is an assembly for reducing emissions produced by an internal combustion engine of a motor vehicle. The assembly comprises a catalyst, a battery, an alternator, and a control relay. The catalyst is disposed in a catalytic converter downstream of the engine and receives exhaust gases therefrom. The catalyst is disposed proximate a substrate of the catalytic converter, which heats the catalyst when electrical power is supplied to the substrate. The alternator is in selective electrical communication with the battery and with the substrate, and is electrically connectable to the substrate to supply power thereto when the engine is operating. The control relay puts the alternator in electrical communication either with the battery under normal operating conditions, or with the substrate when the engine is started. A voltage regulator is also provided in communication with the battery and with the alternator.

Accordingly, it is an object of the present invention to provide an assembly of the type described above in which the alternator is used to supply the power required by the catalyst instead of the vehicle battery.

Another object of the present invention is to provide an assembly of the type described above which allows the use of a simpler control system and smaller wires than conventional electrically heated catalysts.

These and other objects, features, and advantages of the present invention are readily apparent from the following detailed description of the best mode for carrying out the invention when taken in conjunction with the accompanying drawing.

BEST MODE FOR CARRYING OUT THE INVENTION

Figure 1:
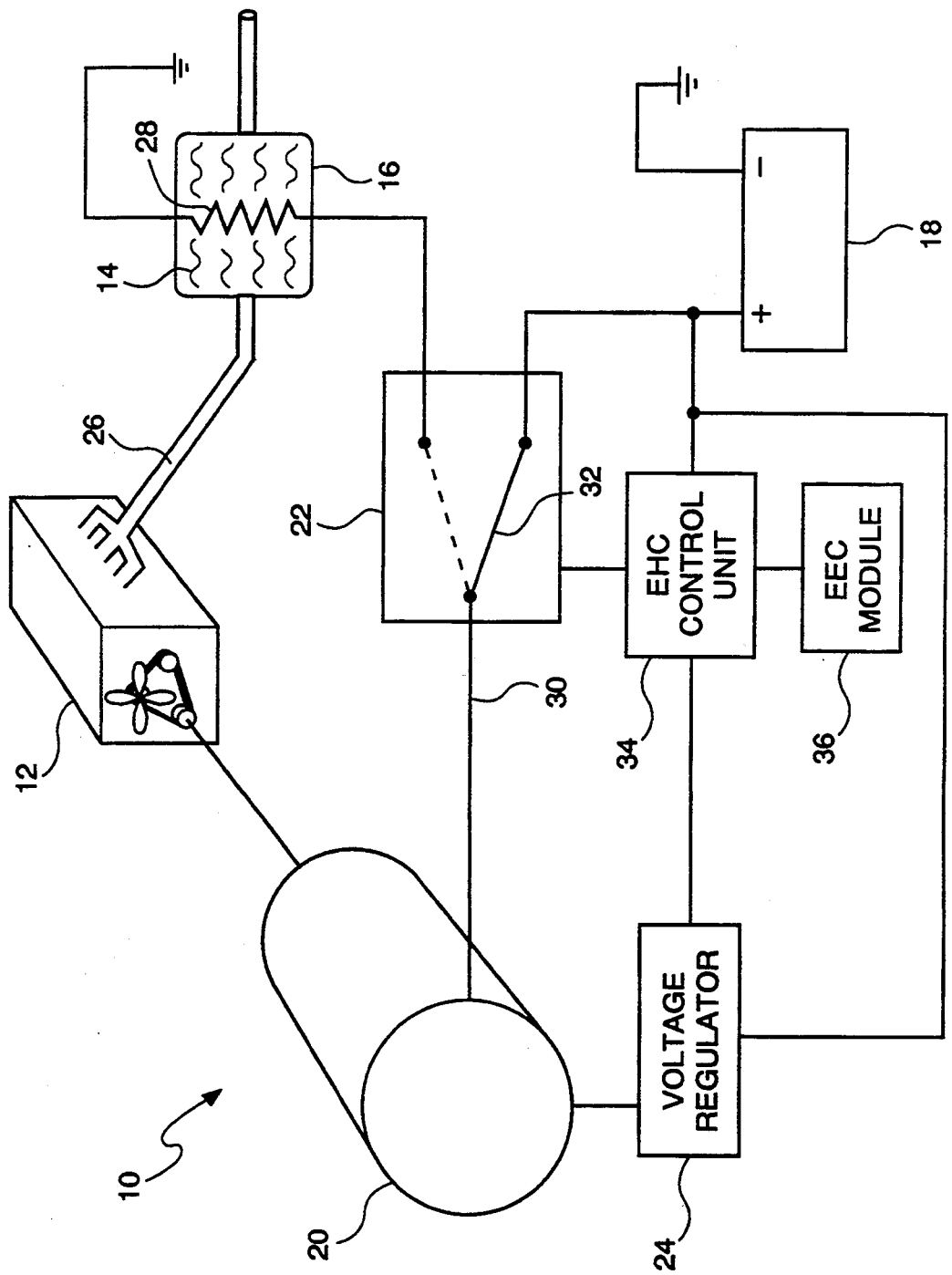
FIG. 1 is a schematic view of an assembly according to the present invention for powering an electrically heated catalyst from an alternator of a motor vehicle.

With reference to the drawing, the preferred embodiments of the present invention will be described. FIG. 1 shows an assembly 10 according to the present invention for reducing emissions produced by an internal combustion engine 12 such as is typically found in a motor vehicle. The assembly 10 comprises a catalyst 14 located in a two-way or three-way catalytic converter 16, a battery 18, a conventional alternator 20, switching means such as a control relay 22, and an alternator voltage regulator 24.

The catalyst 14, which normally comprises an oxidizing catalyst such as platinum and/or palladium and/or a reducing catalyst such as rhodium, Monel and/or ruthenium, is disposed in the catalytic converter 16 downstream of the engine 12. The catalyst 14 is adapted to receive some or all of the exhaust gases from the engine 12 such as through an exhaust pipe 26. A heating element such as a resistor or series of resistors disposed in the catalytic converter 16 proximate the catalyst 14, or preferably a steel substrate 28 of the catalytic converter, functions as a means for heating the catalyst when electrical power is supplied thereto. Preferably, the substrate 28 has a resistance of about 0.5 ohms.

The battery 18 selectively powers the electrical systems, such as the starter motor, lights and radio of the vehicle. As is well known, the battery 18 normally only provides electricity to these systems when the engine 12 is not running. After the engine is started up, the vehicle electrical systems are usually powered by electricity generated by the alternator 20, which in turn runs off the engine 12. The alternator 20 is inselective electrical communication with the battery 18 and with the substrate 28, preferably through an alternator output line 30 and the control relay 22. Before the engine 12 is started, and during normal vehicle operation, an arm 32 of the control relay 22 is set by an electronic control unit 34 to connect the alternator 20 with the battery 18. The arm 32 is switchable by the control unit 34 from its normal position charging the battery 18 to the position shown in phantom in FIG. 1 to put the alternator 20 in electrical communication with the substrate 28.

Immediately upon or within a second or two after the engine is started, the control unit 34 receives input from an electronic engine control module 36 on whether and for how long to energize the substrate 28. The amount of time that electrical energy needs to be supplied to the substrate 28 after start-up is determined by reference to a look-up table stored in the control unit 34, and is related to the temperature of the catalyst 14 at start-up, which can be inferred from the engine coolant temperature, and the elapsed time since last engine operation. If the engine coolant temperature is within a specified range and the time elapsed since last engine operation is greater than a specified time, the electronic engine control module 36 sends out a "turn-on" signal to the control unit 34.

When the control unit 34 receives the "turn-on" signal from the electronic engine control module 36, it performs several steps to switch the alternator output from the vehicle battery 18 to the substrate 28. First, the control unit 34 turns off the voltage regulator 24, which is in communication with the positive output terminal of the battery 18 and is adapted to sense the operating voltage of the battery. Second, the control unit 34 sends a signal to the alternator output control relay 22 to switch output from the vehicle battery to the substrate 28. Third, the control unit 34 switches the voltage regulator back on. When the voltage regulator 24 is switched back on, it senses that the vehicle battery voltage has dropped from its normal charging level of about 14.5 volts, typically to its stand alone voltage of about 12.5 volts. When the voltage regulator senses the initial drop below the normal charging level, indicating connection of the substrate 28 to the alternator 20, the control unit 34 signals the voltage regulator to full field the alternator such that the alternator generates an increased output of between about 30 and 70 volts to the substrate 28. It should be appreciated that the functions of the electronic control unit 34 may be incorporated into the electronic engine control module 36 so that the latter performs all of the control functions.

The exact voltage generated by the alternator 20 is a function of the speed at which the engine 12 is running and the operating requirements of the system. For instance, while the vehicle transmission is not in gear, the electronic engine control module 36 brings the engine idle revolutions per minute (rpm) up, until the transmission is shifted into gear, to a level sufficient to provide enough alternator output power to quickly heat up the catalyst 14. As an alternative to regulating the engine idle speed rpms, a two speed alternator having a first relatively lower speed and a second relatively higher speed when connected to the substrate 28 may be used.

Sufficient power is available from the alternator 20 to quickly heat the catalyst 14 to its desired operating temperature. Heating times range approximately from no heating in the case of an already hot engine to about 20-30 seconds for a cold engine. After the heating time has elapsed, or upon otherwise determining that the catalyst 14 has reached a sufficient operating temperature such as with a dedicated temperature sensor, the electronic engine control module 36 sends out a turn-off signal to the catalyst control unit 34. At this time the engine rpms are lowered to their normal value if the transmission has not yet been shifted into gear.

While the alternator 20 is powering the substrate 28, the remainder of the vehicle electrical systems are powered by the vehicle battery 18. The alternator 20 remains connected to the substrate 28 until the control unit 34 receives the "turn-off" signal. Optionally, the control unit 34 can be adapted to continually monitor vehicle battery voltage to switch the alternator output back to the battery 18 in case the output voltage of the battery drops below a predetermined level, for instance about 11 volts. To switch the power off to the substrate 28, the control unit 34 turns off the voltage regulator 24, sends a signal to the alternator output control relay 22 to switch the arm 32 back to connect the alternator 20 to the vehicle battery 18, and then switches the voltage regulator back on. The control unit 34 also monitors and limits the alternator output voltage to a specified value to ensure the catalyst 14 is not overheated.

By powering the substrate 28 from the vehicle alternator, the present invention eliminates the severe impact electrically heated catalysts have conventionally had on the battery. Also, the alternator provides a higher voltage, and correspondingly lower current, power source that allows the use of a simpler control system and smaller connecting wires than conventional electrically heated catalysts.

Another benefit of this invention is that by making the voltage regulator controlled by the electronic engine control module, the alternator may be regulated to increasingly higher voltages as the vehicle and catalyst age, in order to produce a relatively flat emission deterioration factor. For example, after the vehicle has traveled 4000 miles it may be necessary for the alternator to produce only 1000 watts to effect the desired reaction in the catalyst. After 50,000 miles, the alternator may be required to produce 2000 watts of power to compensate for deterioration of the catalyst. By having the voltage regulator controlled by the electronic engine control module, varying amounts of power can be supplied to the substrate as the vehicle ages to maintain a consistent emission performance. Flat deterioration factors are desirable because of their versatility in being applied across several similar powertrains. Furthermore, if the power level that is required during low mileage operation is for some reason reduced, the present invention is capable of accommodating such a change, thereby improving the fuel economy of the vehicle and reducing the wear and tear on the system as a whole.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. An assembly for reducing emissions produced by an internal combustion engine of a motor vehicle, the assembly comprising:
   a catalyst disposed downstream of the engine and adapted to receive exhaust gases therefrom;
   heating means disposed proximate the catalyst for heating the catalyst when electrical power is supplied to the heating means;
   a battery for selectively powering electrical systems of the vehicle;
   an alternator;
   switching means for putting the alternator in electrical communication with the battery or with the heating means;
   a voltage regulator in communication with the alternator; and
   an electronic controller in communication with the voltage regulator for regulating the operating voltage of the alternator according at least to the age of the catalyst.

2. The assembly of claim 1 wherein the switching means puts the alternator in electrical communication with the heating means when the engine is started.

3. The assembly of claim 1 wherein the switching means comprises a control relay.

4. The assembly of claim 1 wherein the alternator is electrically connected to the heating means within two seconds after the engine is started.

5. The assembly of claim 1 wherein the alternator is electrically connected to the heating means for up to thirty seconds after the engine is started.

6. The assembly of claim 1 further comprising means for sensing the operating voltage of the battery.

7. The assembly of claim 6 wherein the means for sensing comprises the voltage regulator.

8. The assembly of claim 6 wherein the alternator is connected to the battery when the operating voltage of the battery falls below a predetermined level.

9. The assembly of claim 8 wherein the predetermined level is 11 volts.

10. The assembly of claim 1 wherein the alternator generates between about 30 and 70 volts when connected to the heating means.

11. The assembly of claim 10 wherein the voltage generated by the alternator is a function of the speed at which the engine is operating.

12. The assembly of claim 1 wherein the alternator has a first relatively lower speed and a second relatively higher speed when connected to the heating means.

13. The assembly of claim 1 wherein the heating means comprises a substrate of a catalytic converter.

14. The assembly of claim 13 wherein the substrate has a resistance of about 0.5 ohms.

15. An assembly for reducing emissions produced by an internal combustion engine of a motor vehicle, the assembly comprising:
- a catalyst disposed in a catalytic converter downstream of the engine and adapted to receive exhaust gases therefrom;
- a battery for selectively powering electrical systems of the vehicle;
- an alternator in selective electrical communication with the battery and with a substrate of the catalytic converter, the alternator being electrically connectable to the substrate to supply power thereto when the engine is operating;
- a control relay for putting the alternator in electrical communication with the battery or with the substrate, the control relay putting the alternator in electrical communication with the substrate when the engine is started;
- a voltage regulator in communication with the alternator; and
- an electronic controller in communication with the voltage regulator for regulating the power supplied by the alternator according at least to the age of the catalyst.

16. The assembly of claim 15 wherein the alternator generates between about 30 to 70 volts when connected to the resistor.

17. The assembly of claim 16 wherein the voltage generated by the alternator is a function of the speed at which the engine is operating.

18. The assembly of claim 15 wherein the alternator has a first relatively lower speed and a second relatively higher speed when connected to the resistor.

19. The assembly of claim 16 wherein the substrate has a resistance of about 0.5 ohms.

* * * * *